US007231279B2

(12) United States Patent
Ghidotti

(10) Patent No.: US 7,231,279 B2
(45) Date of Patent: Jun. 12, 2007

(54) AUTOMATIC VENDING MACHINE WITH INTEGRATED CAPSULE FEEDING APPARATUS

(75) Inventor: Paolo Ghidotti, Bergamo (IT)

(73) Assignee: N&W Global Vending S.p.A., Bergamo (IT)

( * ) Notice: Subject to any disclaimer, the term of this patent is extended or adjusted under 35 U.S.C. 154(b) by 157 days.

(21) Appl. No.: 10/882,400

(22) Filed: Jul. 2, 2004

(65) Prior Publication Data

US 2005/0038559 A1 Feb. 17, 2005

(30) Foreign Application Priority Data

Jul. 10, 2003 (IT) ........................ PN20030025 U

(51) Int. Cl.
*G06F 17/00* (2006.01)
*A47J 31/00* (2006.01)

(52) U.S. Cl. ..................... 700/239; 221/96; 222/129.3; 222/129.4; 99/302 R; 99/280; 99/290; 99/291; 99/299

(58) Field of Classification Search ............. 222/129.3, 222/129.4, 129.5, 129.1; 700/239; 221/96; 99/290, 299, 295, 302 R, 291, 280, 283, 99/302
See application file for complete search history.

(56) References Cited

U.S. PATENT DOCUMENTS 3,295,998 A * 1/1967 Goros ........................ 221/124
6,595,106 B2 * 7/2003 Eugster ...................... 221/309
6,820,535 B2 * 11/2004 Fischer ..................... 99/289 R

* cited by examiner

*Primary Examiner*—Gene O. Crawford
*Assistant Examiner*—Timothy Waggoner
(74) *Attorney, Agent, or Firm*—Wenderoth, Lind & Ponack, L.L.P.

(57) ABSTRACT

An automatic vending machine includes an integrated capsule dispensing apparatus. The automatic vending machine comprises a first dispensing unit for delivering products that it withdraws from one or more first storage compartments, and is characterized in that it further comprises at least a second dispensing unit for delivering products packaged in the form of capsules that are stored loosely within second storage compartments.

20 Claims, 4 Drawing Sheets

AUTOMATIC VENDING MACHINE WITH INTEGRATED CAPSULE FEEDING APPARATUS

The present invention refers to an automatic vending machine with an integrated capsule dispensing apparatus.

BACKGROUND OF THE INVENTION

Nowadays, particularly felt in automatic product vending machines, and in particular those dedicated to food and similar product vending operations, is a need for consumers, i.e. buyers, to be offered as wide as possible a variety of products, while having all these products duly stored and available for vending within the same machine. An obvious consequence of this resulting increase in the number and types of products offered by the machine for automatic vending, along with the fact that these products are quite often available in a form of differently sized and shaped packages, is a corresponding increase in a size and weight of the vending machine itself. Furthermore, keeping such a large variety of types of products, especially pre-packaged products, on offer for vending implies considerably longer procedures to be followed for restocking the vending machine, upon the latter having run out of supplies on sale, since restocking generally involves placing goods to be sold in an orderly arrangement, such as for example by placing the individual items into stacks or within appropriate spaces that are provided for this purpose between coils of a spiral or circular sectors of a wheel or a dispensing belt, or the like. Use of several automatic machines installed in a side-by-side arrangement may certainly enable a number and variety of products on offer for sale to be increased, but does certainly not solve any of the aforecited machine maintenance problems, nor enables costs for managing and running these machines to be reduced.

SUMMARY OF THE INVENTION

It therefore is an object of the present invention to provide an automatic vending machine with an integrated capsule dispensing apparatus, which does away with the afore-indicated drawbacks and disadvantages.

Within this general object, it is a purpose of the present invention to provide an automatic vending machine with an integrated capsule dispensing apparatus, which enables a large variety of products to be kept on offer for public sale, while reducing not only time required for the machine to be restocked, but also costs for managing and running the machine.

Another purpose of the present invention is to provide an automatic vending machine with an integrated capsule dispensing apparatus, which enables space that is available for such purpose within the vending machine to be used in a most rational manner, thereby allowing a large number of products to be stored in a relatively small space.

Another purpose yet of the present invention is to provide an automatic vending machine with an integrated capsule dispensing apparatus, which is extremely versatile and capable of integrating functions and purposes of several vending machines of a traditional kind into a single vending machine in accordance with the present invention.

According to the present invention, these aims as set forth above are reached in an automatic vending machine with an integrated capsule dispensing apparatus incorporating features and characteristics as recited in the appended claims. Features and advantages of the present invention will anyway be more readily understood from a description that is given below by way of non-limiting examples with reference to the accompanying drawings, in which:

DETAILED DESCRIPTION OF THE PREFERRED EMBODIMENTS

Figure 1:
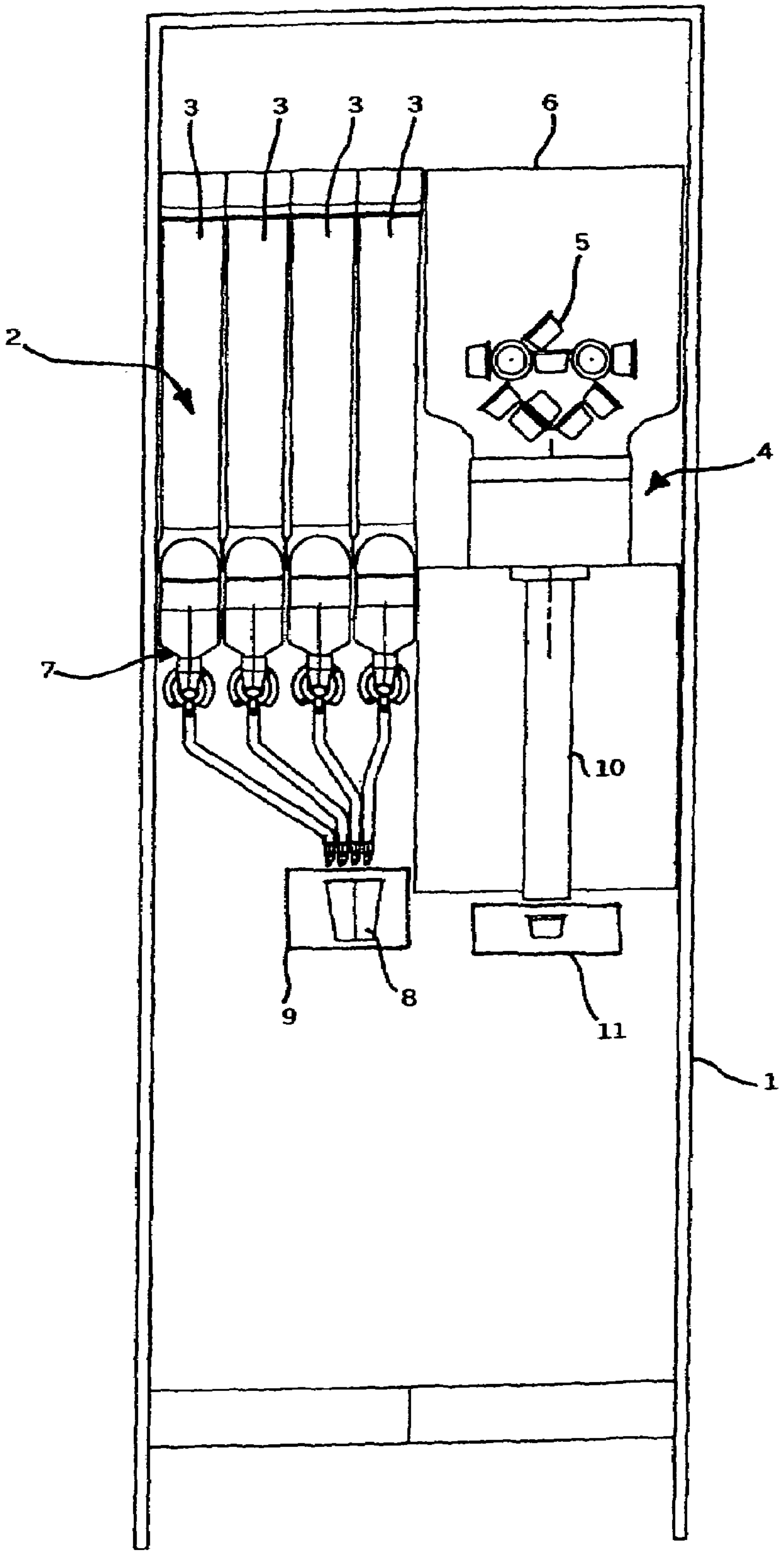
FIG. 1 is a schematical view of a first embodiment of an automatic vending machine with an integrated capsule dispensing apparatus according to the present invention.

FIGS. 1 to 4 can be noticed to each illustrate a different embodiment of an automatic vending machine with an integrated capsule dispensing apparatus according to the present invention. Generally speaking, this vending machine can in turn be noticed to be comprised of an outer casing or cabinet 1 for containing and/or displaying products offered for sale, as well as accommodating various devices needed to handle and deliver such products. Within this outer casing 1 there are in fact provided a first dispensing unit 2 for delivering products that it withdraws from one or more first storage compartments 3, and at least a second dispensing unit 4 for delivering products packaged in the form of capsules 5 that are stored loosely within second storage compartments 6.

FIGS. 1 illustrates a first embodiment of a vending machine according to the present invention, in which the first storage compartments 3 of the first dispensing unit 2 are adapted to hold products intended for brewing, such as for instance tea, coffee, milk or chocolate and the like in powder form. The first storage compartments 3 are further adapted to supply at least a brewing unit 7, in which an actual process takes place for preparation of hot or cold beverages in accordance with a selection made by a buyer. It will however be appreciated that, if desired, each one of the first storage compartments 3 may be associated with a single brewing unit 7. These hot or cold beverages are then delivered by the vending machine directly into a cup 8, which may be picked and withdrawn by the buyer through a first pick-up compartment 9. The second dispensing unit 4 comprises an unloading conduit 10 adapted to convey the capsules 5 from the second storage compartments 6 towards and into a second pick-up compartment 11. It will be readily appreciated that a really large variety of products may be dispensed with help of the capsules 5, and not necessarily depending on other products that can be dispensed, i.e. delivered by the vending machine. So, for instance, the second dispensing unit may dispense capsules 5 containing not only edible products in liquid or solid form, such as different types of sugar, coffee cream, marmalade, jam, cereals, candies, and the like, but also such items as refreshing or moisturized tissues and napkins, surprise prizes and any other similar, small-sized item.

Figure 2:
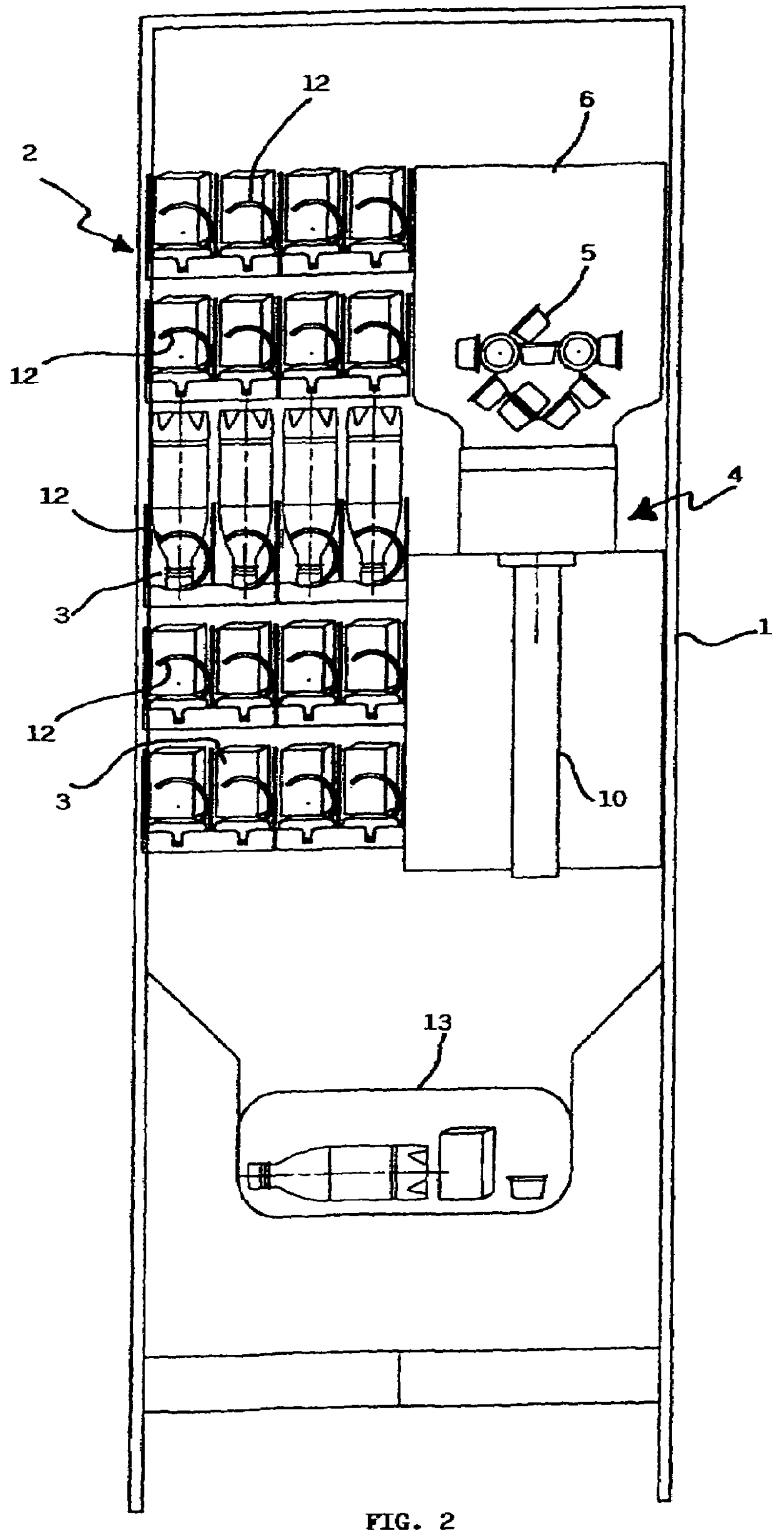
FIG. 2 is a schematical view of a second embodiment of an automatic vending machine with an integrated capsule dispensing apparatus according to the present invention.

A second embodiment of the vending machine according to the present invention is illustrated in FIG. 2, in which first dispensing unit 2 is adapted to supply pre-packaged products in a solid form, such as for instance sweet and/or salty snacks, French fries or chips, candies, and the like. The same first dispensing unit 2 may of course be adapted to dispense pre-packaged beverages, such as for instance any of a wide variety of beverages that are currently available in packages of food-grade paper or plastic material. Preferably, delivery of these pre-packaged products and/or beverages is effected through rotation of spiral-shaped devices 12, in which a space between two successive coils of a same spiral defines first storage compartments 3. Second dispensing unit 4 delivers capsules 5 through an unloading conduit 10 so as to make the capsules 5 available for collection in a pick-up cavity 13, which is the same as the one from which the products delivered by the first dispensing unit 2 can be collected by a buyer.

Figure 3:
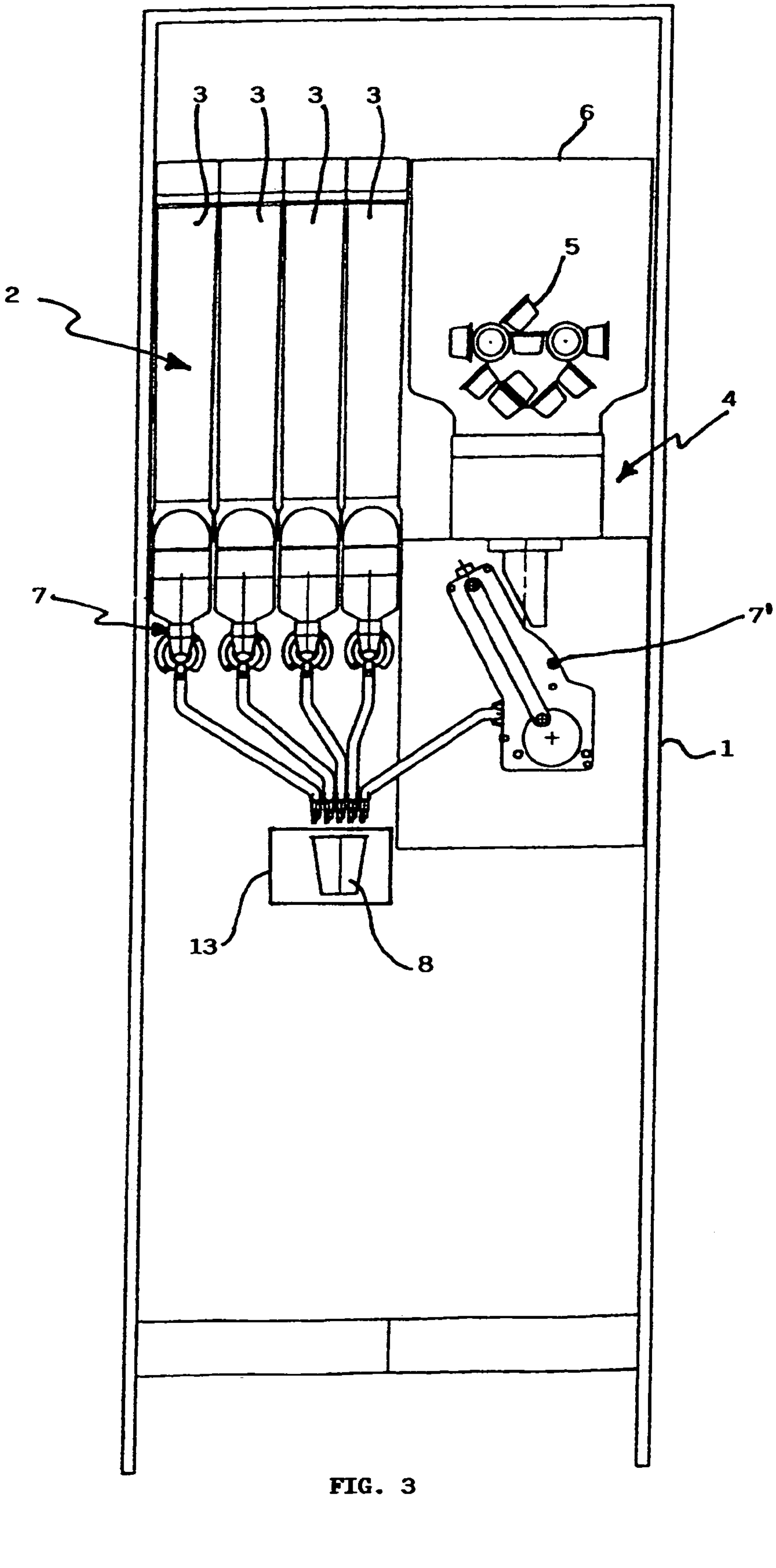
FIG. 3 is a schematical view of a third embodiment of an automatic vending machine with an integrated capsule dispensing apparatus according to the present invention.

FIG. 3 schematically illustrates a third embodiment of the present invention, in which first dispensing unit 2 is similar to the one described in connection with the first embodiment considered hereinbefore with reference to FIG. 1. In this third embodiment, capsules 5 delivered by second dispensing unit 4 are fed into a brewing unit 7', which is of a kind adapted to prepare hot or cold beverages by infusion of substances contained in capsules. Since brewing units are largely known to exist in the art, which are capable of operating with both infusion substances in the form of loose powder and infusion substances contained in capsules, a possibility is given for this vending machine to be fitted and set up in such a manner as to have both products in first storage compartments 3 and the capsules 5 accommodated in second storage compartments 6 of the second dispensing unit 4 being fed into the same brewing unit. In this third embodiment of the present invention, the first dispensing unit 2 and the second dispensing unit 4 deliver such produced hot or cold beverages directly into a cup 8 that can be collected by a buyer through a common pick-up cavity 13.

Figure 4:
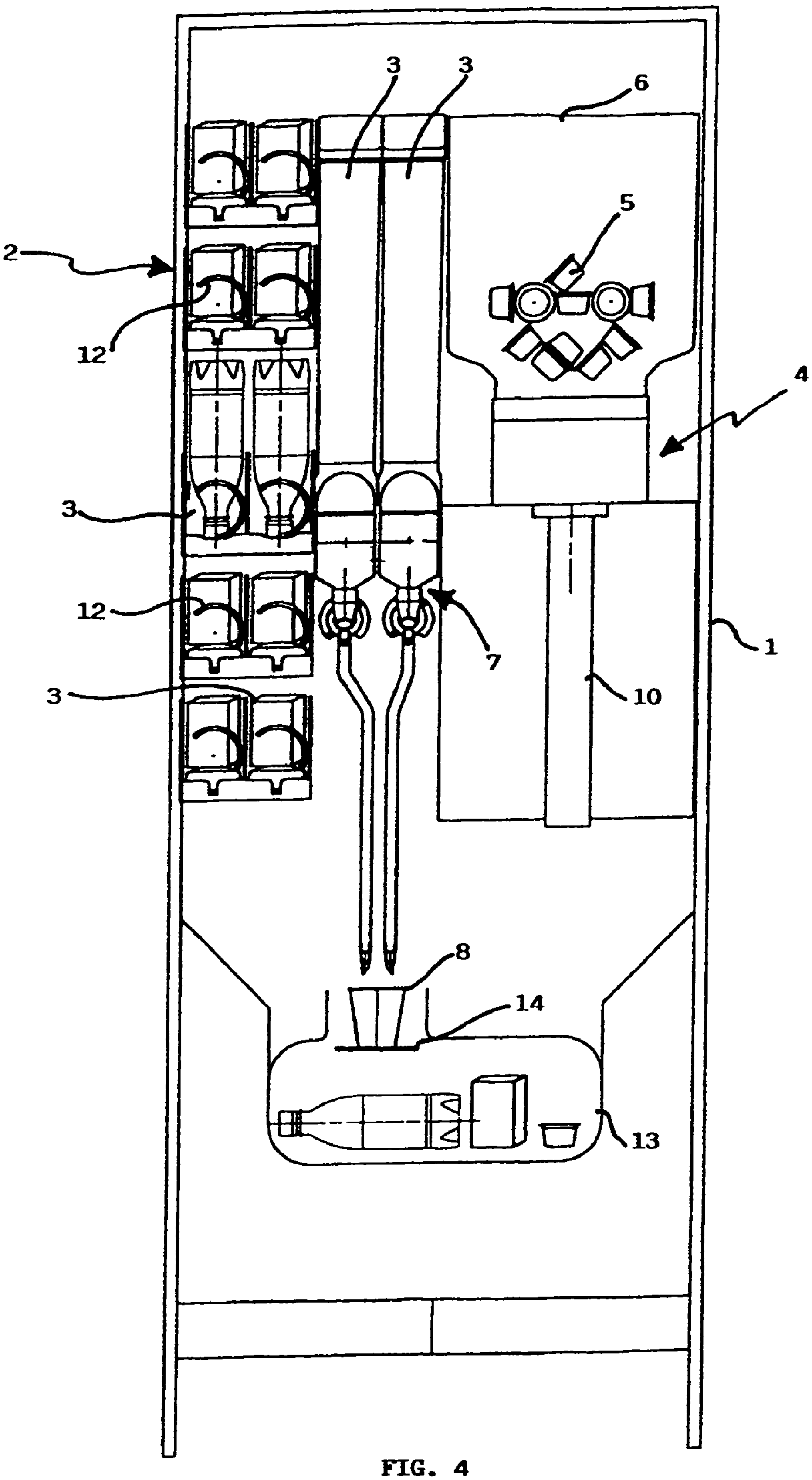
FIG. 4 is a schematical view of a fourth embodiment of an automatic vending machine with an integrated capsule dispensing apparatus according to the present invention.

A fourth embodiment of the present invention is illustrated in FIG. 4, in which first dispensing unit 2 combines the features indicated for the first dispensing unit 2 in connection with both the afore-described first and second embodiment of the present invention. In this case, in fact, the first dispensing unit 2 is adapted to both dispense pre-packaged products and beverages and supply a brewing unit for preparation of hot or cold beverages by infusion. Such first dispensing unit 2 comprises first storage compartments 3 of a kind adapted to accommodate infusion products, as well as of a kind adapted to accommodate pre-packaged products and beverages. Delivery of the pre-packaged products and beverages takes place in the same manner as previously described with reference to the second embodiment of the present invention, whereas, as far as preparation of hot or cold beverages by infusion is concerned, the same considerations apply as set forth in connection with the afore-described first embodiment of the present invention.

Second dispensing unit 4 is similar to the one described in connection with the first embodiment illustrated in FIG. 1. Products delivered by the two dispensing units 2 and 4 can be collected by a buyer from a common pick-up cavity 13 that is provided with structure 14 adapted to firmly retain a cup 8 into which the hot or cold beverages are being poured.

Fully apparent from the above description is therefore an ability of the present invention to effectively reach the aforecited aims and advantages by providing an automatic vending machine with integrated capsule feeding apparatus, which, apart from being very versatile, enables a large number and variety of products to be kept on offer for sale to the public, with all these products being stored in a most rational manner within the same machine. It has been further found that the present invention actually enables time needed to restock a vending machine to be considerably reduced, owing to merchandise being partly loaded loosely, i.e. in no pre-established order in a storage compartment, thereby deriving an advantage of being able to store a large number of products in a relatively small-sized space, while at the same time reducing maintenance and operating costs. Fully apparent from the above description is finally a capability of the present invention of actually integrating functions and purposes of several vending machines of a traditional kind into a single vending machine in accordance with the present invention.

It should be noticed that materials used, as well as shapes and sizing of individual items of an apparatus of the invention, may each time be selected so as to more appropriately meet particular requirements or suit a particular application.

Various items and parts entering construction of the apparatus of the present invention shall of course not be embodied strictly and solely in the manner that has been described and illustrated above, but can rather be implemented in a number of different embodiments, all of which falling within the scope of the present invention.

The invention claimed is:

1. An automatic vending machine comprising:

a first dispensing unit for delivering products that have been supplied from at least one first storage compartment; and a second dispensing unit for delivering products packaged in capsules that are oriented randomly within second storage compartments, wherein said first dispensing unit and said second dispensing unit are arranged in parallel such that each of said first dispensing unit and said second dispensing unit is capable of independently delivering corresponding products to a user accessible pick-up cavity.

2. The automatic vending machine according to claim 1, wherein said first dispensing unit is for delivering products that have been supplied from at least one first storage compartment by delivering, as part of a hot or cold beverage, a product supplied from the at least one first storage compartment to a brewing unit.

3. The automatic vending machine according to claim 2, wherein said second dispensing unit is for delivering products packaged in capsules that are oriented randomly within second storage compartments by delivering the products to another brewing unit for preparation of hot or cold beverages.

4. The automatic vending machine according to claim 3, wherein each of said first dispensing unit and said second dispensing unit is capable of independently delivering corresponding products to a user accessible pick-up cavity by being capable of independently delivering the corresponding products to the same user accessible pick-up cavity.

5. The automatic vending machine according to claim 2, wherein said second dispensing unit is for delivering products packaged in capsules that are oriented randomly within second storage compartments by delivering the products to the brewing unit for preparation of hot or cold beverages.

6. The automatic vending machine according to claim 1, wherein said first dispensing unit is for delivering products that have been supplied from at least one first storage compartment by delivering pre-packaged products in a solid form that have been supplied from the at least one first storage compartment.

7. The automatic vending machine according to claim 6, wherein said first dispensing unit includes spiral-shaped devices, and said first dispensing unit is for delivering the pre-packaged products via rotation of said spiral-shaped devices.

8. The automatic vending machine according to claim 1, wherein said first dispensing unit is for delivering products that have been supplied from at least one first storage compartment by delivering pre-packaged beverages that have been supplied from the at least one first storage compartment.

9. The automatic vending machine according to claim 8, wherein said first dispensing unit includes spiral-shaped devices, and said first dispensing unit is for delivering the pre-packaged beverages via rotation of said spiral-shaped devices.

10. The automatic vending machine according to claim 1, wherein each of said first dispensing unit and said second dispensing unit is capable of independently delivering corresponding products to a user accessible pick-up cavity by being capable of independently delivering the corresponding products to the same user accessible pick-up cavity.

11. The automatic vending machine according to claim 10, wherein said second dispensing unit is for delivering products packaged in capsules that are oriented randomly within second storage compartments by delivering the products to a brewing unit for preparation of hot or cold beverages.

12. The automatic vending machine according to claim 1, wherein said second dispensing unit is for delivering products packaged in capsules that are oriented randomly within second storage compartments by delivering the products to a brewing unit for preparation of hot or cold beverages.

13. The automatic vending machine according to claim 1, wherein said first dispensing unit is for delivering products that have been supplied from at least one first storage compartment by (i) delivering pre-packaged products and pre-packaged beverages from two first storage compartments, respectively, and (ii) delivering, as part of a hot or cold beverage prepared by infusion, a product supplied from another first storage compartment to a brewing unit for preparation of the hot or cold beverage by infusion.

14. An automatic vending machine comprising:

a first dispensing unit for delivering products that have been supplied from at least one first storage compartment; and a second dispensing unit for delivering products packaged in capsules that are stored in no pre-established spatial relationship within second storage compartments, wherein said first dispensing unit and said second dispensing unit are arranged in parallel such that each of said first dispensing unit and said second dispensing unit is capable of independently delivering corresponding products to a user accessible pick-up cavity.

15. The automatic vending machine according to claim 14, wherein said first dispensing unit is for delivering products that have been supplied from at least one first storage compartment by delivering pre-packaged products in a solid form that have been supplied from the at least one first storage compartment.

16. The automatic vending machine according to claim 14, wherein said first dispensing unit is for delivering products that have been supplied from at least one first storage compartment by delivering pre-packaged beverages that have been supplied from the at least one first storage compartment.

17. The automatic vending machine according to claim 14, wherein said first dispensing unit is for delivering products that have been supplied from at least one first storage compartment by delivering, as part of a hot or cold beverage, a product supplied from the at least one first storage compartment to a brewing unit.

18. The automatic vending machine according to claim 17, wherein said second dispensing unit is for delivering products packaged in capsules that are stored in no pre-established spatial relationship within second storage compartments by delivering the products to another brewing unit for preparation of hot or cold beverages.

19. The automatic vending machine according to claim 14, wherein said second dispensing unit is for delivering products packaged in capsules that are stored in no pre-established spatial relationship within second storage compartments by delivering the products to a brewing unit for preparation of hot or cold beverages.

20. The automatic vending machine according to claim 14, wherein said first dispensing unit is for delivering products that have been supplied from at least one first storage compartment by (i) delivering pre-packaged products and pre-packaged beverages from two first storage compartments, respectively, and (ii) delivering, as part of a hot or cold beverage prepared by infusion, a product supplied from another first storage compartment to a brewing unit for preparation of the hot or cold beverage by infusion.

* * * * *